Dec. 26, 1972 V. A. FILES 3,707,371
PHOTOSENSITIVE ELEMENT COMPRISING A POLYMER MATRIX INCLUDING
STYRENE, AURAMINE O, AND A PEROXIDE AND THE USE
THEREOF IN VOLUME RECORDING
Filed Dec. 14, 1970
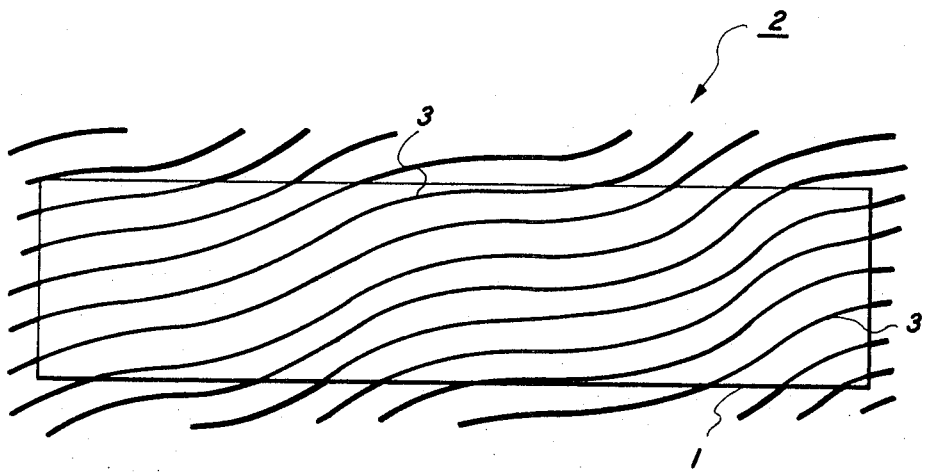
INVENTOR.
VICTOR A. FILES
BY
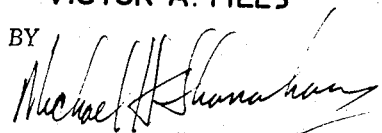
ATTORNEY United States Patent Office 3,707,371
Patented Dec. 26, 1972

3,707,371
PHOTOSENSITIVE ELEMENT COMPRISING A POLYMER MATRIX INCLUDING STYRENE, AURAMINE O, AND A PROXIDE AND THE USE THEREOF IN VOLUME RECORDING
Victor A. Files, Rochester, N.Y., assignor to Xerox Corporation, Stamford, Conn.
Filed Dec. 14, 1970, Ser. No. 97,865
Int. Cl. G03c 5/04, 1/72, 1/68
U.S. Cl. 96—27 H      18 Claims

ABSTRACT OF THE DISCLOSURE

Refractive index changes are made within the volume of a photosensitive member that absorbs incident radiation to yield the change in refractive index and bleaches to a non-absorbing condition to allow writing radiation to penetrate further into the volume of the member.

BACKGROUND OF THE INVENTION

This invention relates to imaging systems and in particular to methods and materials for photosensitive polymer imaging systems.

Photopolymers are candidates for many imaging applications including those for producing diffraction gratings, volume holograms and optical wave guides. In the case of the diffraction gratings, 100 percent diffraction efficiency is predicted for an optically transparent recording member having radiation interference fringes recorded within its volume in the form of changes in refractive index. The 100 percent predicted efficiency is intuitively suspected because the recording medium, being transparent, does not absorb the incident radiation yet the transmitted radiation is modulated by the change in refractive index between exposed and non-exposed regions of the recording member. A problem in obtaining the predicted efficiency for the diffraction grating and for optimizing performance for other application is finding a recording member that is transparent yet electrically and/or chemically photosensitive.

One approach for developing the desired recording member is to employ photopolymers that are transparent to visible radiation yet chemically photosensitive to some other portion of the electromagnetic radiation spectrum. A specific example of a recording member of this type is given in Applied Physics Letters of June 15, 1970, volume 16, No. 12, pages 486–489 wherein polymethylmethacrylate, which is transparent to the visible portion of the spectrum, is formed from a methylmethacrylate monomer exposed to ultraviolet radiation. This approach is nonetheless still far from ideal, in particular, when attempting to record information within the volume of the member. The problem is that the writing radiation is attenuated as it penetrates the volume of the member because it is absorbed by each successive layer. Consequently, the writing radiation must be very intense and/or the absorption by the material comprising the member must be low if the depths of the material are to be affected.

Accordingly, it is an object of this invention to overcome the above noted difficulties.

Another object of this invention is to develop recording materials that are photosensitive to writing radiation yet transparent to readout radiation.

Still another object is to devise methods and materials for recording electromagnetic radiation patterns in three dimensions, i.e. within the volume of a recording member.

A further object of the present invention is to develop recording members that are photosensitive and transparent to readily available, high energy radiation wavelengths within and near the visible spectrum.

Yet another object of this invention is to develop a photosensitive member capable of absorbing incident radiation to record its presences and thereafter become non-absorbing or at least less absorbing to permit recording throughout the entire volume of the member.

A specific object of this invention is the fabrication of high efficiency volume diffraction gratings.

These and other objects of the instant invention are accomplished with a recording member fabricated by sensitizing a polymer with a photobleaching dye. The dye enables the recording member to respond to radiation within the visible spectrum causing local refractive index changes. At substantially the same time, the member is bleached by the writing radiation thereby enabling it to penetrate the volume of the member and leaving the member transparent to readout radiation. In addition, difficult material handling problems normally associated with photosensitive liquid monomers are solved by initiating polymerization with heat and/or catalysts. Material handling is further assisted by including an adhesive with the monomer.

DESCRIPTION OF THE DRAWING

Other objects and features of the present invention will be apparent from the present description and from the drawings. The drawing is a schematic illustration of a side view of a thick recording member 1 and an interference pattern 2 superimposed over the recording member. The interference pattern includes a plurality of fringes 3 that are formed by the interaction of interfering coherent radiation wave fronts. The interference pattern 2 is representative of that formed by the interaction of a spherical or planar reference radiation wave front and a like wave front modulated by an object. The angle that the fringes make with the faces of the recording member are indicative of a Lippman type interference pattern where the object and reference wave fronts are directed at one another from opposite sides of member 1, i.e. at angles between 90 and 180 degrees.

DESCRIPTION OF THE EMBODIMENTS

The following description and examples are presented in terms of a thick holographic diffraction grating, but it should be understood that the methods and materials discussed are readily adapted to other imaging applications such as formation of volume holograms, high density information storage devices, optical wave guides and other optical pieces such as lenses. The diffraction grating is chosen for discussion because its manufacture illustrates the problems associated with volume and surface image recording in and on photosensitive materials.

The present recording members and methods represent a novel approach to volume recording in that the exposing radiation yields a unique combination of results. The two results are information recording in terms of change in refractive index and bleaching. Consequently, the present member and methods approach the ideal because the recording member initially absorbs writing radiation allowing information to be recorded and thereafter is non-absorbing allowing deeper penetration of the writing radiation and modulation of readout radiation without attenuation by absorption and/or unwanted diffraction. The refractive index change is presumptively a result of change in the molecular density of the member. Molecular density changes are presently believed obtainable by photopolymerization and/or photografting. The significantly high diffraction efficiencies obtained by the members described in the examples (98%–100%) indicate that the most significant mechanism is photografting. The photobleaching material is auramine O which absorbs radiation within the visible spectrum and undergoes side-chain dissociation into two molecules one of which is styrene. Side-chain dissociation in rigid media is reported by G. Porter and E. Strachan in the British publication Faraday Society Transactions volume 54, November, 1958 beginning at page 1595. When styrene is the polymer to which the auramine O is added, the dissociated styrene molecule attaches, i.e. is grafted, to the styrene matrix thereby yielding an increase in molecular density, i.e. a change in refractive index. The dissociated dye is no longer absorbing so radiation effecting the side-chain dissociation, and/or other mechanism is able to reach the dye within the entire volume of the member.

The photografting mechanism can be extended to include all aromatic molecules. Specifically, molecules of the general structure $C_6H_5CHXCH_2Y$ photochemically undergo side-chain dissociation into two molecules one of which is styrene ($C_6H_5CH_2CH$) when in a rigid medium. Auramine O is a diphenylmethane molecule. The unexposed areas of the recording member are bleached out due to the presence of the peroxide, absorption of energy in the form of heat or from energy liberated from the irreversible dissociation process.

The present unique approach to volume recording is also explainable in terms of a photobleachable material absorbing incident radiation to which a polymer matrix is normally non-sensitive coupled with transfer of the absorbed energy to the polymer to cause additional polymerization, i.e. increased molecular density and refractive index change. The absorbed radiation also bleaches the photobleachable material permitting penetration of the writing radiation and transmission of readout radiation.

The presently preferred materials with which the present invention is practiced are broadly those employed as optical cements. Generally, optical cements exhibit high transmission through the visible radiation region of the electromagnetic radiation spectrum (herein occasionally referred to as light). The adhesive properties of the cement solves many material handling problems. In addition, most cements, when cured, are relatively inert to environmental extremes both chemical and physical. Furthermore, because they are used in optical apparatus, the cements are free of particulate matter that could cause image degradation.

As with most hydrocarbons, optical cements are liquids in their manufactured or preparatory states which creates both handling and imaging problems. Liquids are generally more difficult to position, manipulate, etc., especially in optical systems where rigidity vis-a-vis movement is desirable. For example, in holography the recording member should be fixedly supported relative to the interference pattern (e.g. pattern 2 in the drawing) because the distance between the fringes is in terms of wavelengths and any vibration or other movement would result in uniform exposure of the recording member. Accordingly, in the present invention, a photopolymerizable material is at least partially cured before exposure to the writing radiation to give structural integrity to the member. The rigidity is also a desirable condition for the side-chain dissociation of the exposed auramine O as indicated above.

The preferred optical cements include resins that experience polymerizations upon exposure to ultraviolet radiation. In the present embodiments, the monomers are also polymerizable by heat and/or the addition of an organic peroxide and are, in fact, at least partially polymerized by addition of the peroxide free radical initiator. Heat is generally employed to drive off the carrier polymer solvent for the adhesive and monomer although it also initiates some polymerization. Also, heating the mixture above the glass transition points insures rigidity. Examination of these partially cured materials after exposure to the ultraviolet indicates that they absorb substantially all the ultraviolet radiation in depths less one wavelength. Since the ultraviolet region includes radiation wavelengths within 3.25.0 to 3.75.0 nm., it is clear that information is not recorded throughout the volume of a material that has a thickness many times greater than one wavelength, i.e. from 1 to 10 microns thick, because all the writing radiation is absorbed near the surface of the member.

The present invention represents a startling discovery; namely, that a photobleachable material is suitable as a photosensitizer. Normally, photobleachable materials are rejected as photosensitizers because they resort to a leuco state, i.e. a non-absorbing or bleached state, upon exposure. In this invention, the photobleachable material enables absorbed radiation to effect refractive index changes continuously throughout the volume of the material because the exposed areas are rendered non-absorbing permitting radiation to penetrate further into the volume of the member. An equally surprising result is the discovery that a non-bleachable dye added with the photobleachable material is also rendered non-absorbing when exposed. This later discovery enables the range of writing radiation wavelengths to be greatly expanded since the absorption band of the basic photobleachable material is expanded.

The following examples illustrate specific compositions for the present recording member and the steps for manufacturing it. In the examples, the matrix polymer and sensitizer are selected such that exposure of the sensitizer frees a molecule from the sensitizer that is highly similar to the matrix polymer thereby increasing molecular density. The specifically illustrated materials include a styrene matrix material and auramine O sensitizer but other combinations of polymer and sensitizer are possible if selected according to the disclosed criteria.

Diffraction efficiency as used herein refers to the ratio of light diffracted by the recording number into the +1 order to the sum of the light diffracted by the recording member into the +1 order and the light diffracted into the zero order. Measurements are made by directing a coherent beam through the exposed recording member at the Bragg angle onto a photocell positioned to intercept the +1 diffracted order and by directing the same beam though the recording member normal to the diffraction grating onto a photocell positioned to intercept the zero diffracted order.

EXAMPLE I

The photopolymerizable material is Opticon UV–57 optical cement available from Opticon Chemical, Inc., Wilmington, Calif., a division of Dynalysis, Inc. UV–57 is a styrene-ester copolymer, with a photosensitive synthetic resin adhesive. It sets in approximately 5 minutes when exposed to ultraviolet radiation, specifically when exposed to a General Electric Type RS Sunlamp of 275 watts. The photosensitive curing may be extended to 30 minutes for greater strengths. UV–57 has a measured viscosity of 830 centipoises (cps.) at 78° F., Spindle 3, 60 r.p.m., a specific gravity of 1.12 and a service temperature range from −65° F. to +200° F. UV–57 has a refractive index of 1.5316, a light transmission of 93% for wavelengths from 400 to over 800 nm. Once cured, UV–57 does not flow under heat and pressure, it does not dissolve in ketone, ester, aromatic or aliphatic solvents and it withstands non-oxidizing mineral acids up to 70% but is slowly attacked by concentrated sodium hydroxide solutions. The bond of the cured cement is weakened by soaking the material in acetone. UV–57 is cured by ultraviolet or by adding 8 drops of C–12 (organic peroxide) catalyst to 10 grams UV–57. The cure rate is increased or decreased by adding slightly larger or smaller concentrations of catalyst. Heat accelerates the rate of cure whether ultraviolet or catalyst is used.

10 milliliters (ml.) of UV–57 is mixed with 0.4 ml. auramine O, saturated solution of methanol (the photobleachable material) and 0.6 ml. of Opticon C–12 catalyst (organic peroxide). The materials are mixed together manually until the Schlieren effect is no longer visible. The materials are placed into a vacuum chamber that it evacuated to 0.1 millimeters (mm.) mercury until excess air is removed from the mixture. While still in a viscous state, the mixture is coated with a glass rod onto a flat transparent glass plate to an average thickness of 300 microns, a coverslip, a thin transparent glass plate, is placed over the mixture forming a sandwich. The coverslip eliminates the possibility of surface deformations occurring in the mixture, i.e. the recording member, during exposure. The sample is placed into an oven at 80° C. to accelerate the catalyst curing and the sample is removed from the oven when it is sufficiently rigid so as to resist flowing with gravity.

The prepared sample is the recording member, and it is exposed to radiation to which the auramine O is sensitive; namely, radiation extending from the ultraviolet through yellow-green and peaking at about 420.0 nm. The light source includes the appropriate lines emitted from a 2.5 watt (w.) argon laser. The beam generated by the laser is collimated, split into two beams by an appropriate beam splitter and reflected by mirrors to intersect so as to form a stationary interference pattern. The angle of intersection of the two beams is varied from a few degrees, in which case the interference fringes such as fringes 3 in the drawing, are nearly normal to the plane of the recording member to nearly 180 degrees in which case the interference fringes are nearly parallel to the plane of the recording member as with fringes 3 in the drawing.

The partially cured recording member taken from the oven is further cured by the radiation of the interference pattern established by the laser. The exposure yields about a $5 \times 10^{-3}$ change in the refractive index of the recording member. The change in refractive index is presumptively the result of an increase in molecular density in the exposed regions. The refractive index change occurs substantially uniformly throughout the entire volume of the member. Auramine O, in the presence of peroxide, is bleachable to a colorless or leuco-state, consequently, the depth of the member receive substantially unattenuated radiation and the exposed member is substantially transparent to visible radiation. Diffraction efficiencies greater than 90% were obtained for a readout beam emitted by the above argon laser directed onto the member at the Bragg angle.

EXAMPLE II

A recording member is prepared in accordance with Example I except ethyl violet saturated in methanol, a dye, is added to the basic mixture of UV-57, auramine O and catalyst in the following proportions: 10 ml. UV 57; 0.2 ml. auramine O saturated in methanol; 0.3 ml. Opticon C-12 catalyst (organic peroxide); and 0.1 ml. of ethyl violet saturated in methanol.

The recording member is exposed as in Example I to all the major spectral lines from the 2½ watt argon and a one watt Krypton lasers. These lines range from 457.9 nm. to 647.0 nm. The efficiencies of the resultant holographic volume diffraction gratings are:

| Wavelength, nm. | Energy (ergs. cm.) | Efficiency, percent |
| --- | --- | --- |
| 457.9 | $5.4 \times 10^6$ | 98 |
| 476.5 | $2.1 \times 10^7$ | 97 |
| 488.0 | $7 \times 10^7$ | 97 |
| 514.5 | $7.6 \times 10^8$ | 87 |
| 520.8 | $5.5 \times 10^8$ | 92 |
| 568.2 | $2.3 \times 10^8$ | 91 |
| 632.8 | $8.2 \times 10^7$ | 91 |
| 647.1 | $8.2 \times 10^7$ | 90 |

The startling result in this examle is that the ethyl violet is bleached to a colorless state along with the auramine O whereas it does not photobleach if the auramine O is omitted.

EXAMPLE III

A recording member is formed and exposed in the same manner as in Example I except Lens Bond UV-66 available from Summers Laboratories, Fort Washington, Pa., is substituted in like proportions for the Opticon UV-57.

EXAMPLE IV

A recording member is prepared and exposed as in Example II except Rhodamine B, xanthene, is substituted for the ethyl violet in like proportions. Polymerization occurs with radiation between 450 and 700 nm. with the Rhodamine B bleaching out with the auramine O but failing to do so in samples made without the auramine O.

EXAMPLES V-X

Recording members are made and exposed according to Example IV with the following dyes substituted for the Rhodamine B. The exposure wavelengths are given with the specific dye: Brilliant Green 450–770 nm.; Malachite Green 450–759 nm.; Victoria Blue 450–770 nm.; all amino triphenylmethanes; Eosin 450–660 nm.; and, Erythrosin 450–560 nm., both xanthenes. In the case of each dye, it bleaches to a colorless state in the presence of auramine O but not in its absence. Diffraction efficiencies of the resultants grating exceeded 90% exceeded 90% efficiencies in all cases.

EXAMPLE XI

A recording member is also prepared from the following. 5 ml. styrene monomer available from Eastman Chemical number 1465 stabilized with tert butylpyrocatechol, is copolymerized with one gram (gm.) of isobutyl methacrylate, available from DuPont Corp. number 2045 under the tradename "elvacite" acrylic resin 2 ml. of auramine O, the same material used in the other examples and available from Eastman Chemical number C8688, dye content 83 percent, saturated in methanol, is mixed with the liquid copolymer of styrene-isobutyl methacrylate. 0.1 gram of benzolperoxide is added to the foregoing mixture. The organic peroxide provides free radicals for monomer polymerization and satisfies conditions for photobleaching the auramine O. The foregoing mixture has a viscosity of approximately 150 cps. The mixture is deaerated at 0.1 mm. mercury and coated to about 300 microns thickness on a glass plate. A coverslip is placed over the coating to insure uniformity in thickness and to eliminate the possibility of surface deformation. (The thickness here and all the examples, is generally several times greater than the exposure wavelength to guarantee satisfaction of Bragg conditions.

The coated glass plate is inserted into an 80° C. oven for one minute or until the coating becomes sufficiently rigid to resist flowing under gravity. The resultant structure is the recording member. It is exposed as in Example I to form a volume diffraction grating.

In all the above examples, the energy levels affecting refractive index changes in the order of $10^{-4}$ to $10^{-3}$ are about $10^6$–$10^8$ erg./cm.$^2$. All the recording members exhibited resolutions of the magnitude of 5000 lines/mm.

The recording members in the above examples are also formed by molding them in forms rather than coating them on substrates. In this case, the adhesive properties may be minimized or completely eliminated.

Although the foregoing description presents the present invention in terms of specific methods, materials and applications, it is apparent that equivalent materials may be substituted, other manufactures followed and other uses found. All such substitutions and changes consistant with sensitizing polymers with photobleachable materials are within the scope of the instant invention.

What is claimed is:

1. A radiation sensitive member comprising a polymer matrix including styrene, a photobleachable material consisting essentially of auramine O, and a peroxide wherein said member is capable of absorbing electromagnetic radiation for changing its refractive index and for bleaching to permit radiation to change the refractive index within the volume of said member and to render the member substantially transparent to readout radiation.

2. The member of claim 1 wherein said matrix includes Opticon UV-57 optical cement.

3. The member of claim 1 further including a dye sensitizer material having a primary radiation absorption spectrum different than the primary radiation absorption spectrum of said photobleachable material.

4. The member of claim 3 wherein said dye sensitizer material includes ethyl violet.

5. The member of claim 2 further including a dye sensitizer material having a radiation absorption spectrum different than the radiation absorption spectrum of said photobleachable material.

6. The member of claim 5 wherein said dye material includes ethyl violet.

7. The member of claim 5 wherein said dye material includes Rhodamine B.

8. The member of claim 5 wherein said dye material includes Brilliant Green.

9. The member of claim 5 wherein said dye material includes Malachite Green.

10. The member of claim 5 wherein said dye material includes Victoria Blue.

11. The member of claim 5 wherein said dye material includes eosin.

12. The member of claim 5 wherein said dye material includes erythrosin.

13. The member of claim 1 wherein said refractive index changing, bleaching and readout radiation to which said member is responsive are within the visible region of the electromagnetic radiation spectrum.

14. The method of making a diffraction grating comprising exposing a member according to claim 1 to an interference pattern created by the interference of two plane collimated coherent radiation wavefronts, whereby the refractive index is changed in the exposed region of the member and the member is rendered substantially transparent to read-out radiation.

15. The method of claim 14 wherein the angle between the two wavefronts is between 0 and 90 degrees.

16. The method of claim 14 wherein the angle between the two wavefronts is between 90 and 180 degrees.

17. A method of recording information within the volume of a member comprising imagewise exposing the member of claim 1 to radiation within the absorption spectrum of said photobleachable material.

18. The method of claim 17 wherein said photobleachable material has a primary radiation absorption spectrum for changing refractive index that substantially coincides with its radiation bleaching spectrum.

References Cited

UNITED STATES PATENTS 3,300,314 1/1967 Rauner, et al. _____ 96—90 X
3,060,026 10/1962 Heiart _____ 96—27 X

OTHER REFERENCES

Kosar: Light-Sensitive System-Chemistry and Application of Nonsilver Halide Photographic Processes; pp. 170–172, 184, 388–392.

Applied Physics Letters, vol. 14, Number 5, Hologram Recording On Photopolymer Materials, pp. 159–160.

J. TRAVIS BROWN, Primary Examiner

W. H. LOUIE, JR., Assistant Examiner

U.S. Cl. X.R.

96—48 R, 89, 115; 350—3.5